United States Patent [19]

Sawicki

[11] 4,421,675
[45] Dec. 20, 1983

[54] PROCESS

[75] Inventor: Robert A. Sawicki, Wappingers Falls, N.Y.

[73] Assignee: Texaco Inc., White Plains, N.Y.

[21] Appl. No.: 337,915

[22] Filed: Jan. 8, 1982

[51] Int. Cl.³ .............................................. B01J 31/02
[52] U.S. Cl. .................................... 502/150; 560/236; 568/437; 502/172
[58] Field of Search ................................ 252/428, 430

[56] References Cited

U.S. PATENT DOCUMENTS 3,984,349 10/1976 Meiller et al. ........................ 252/428
4,159,966 7/1979 Roberts ................................ 252/430
4,199,330 4/1980 Nestrick et al. ................. 252/428 X Primary Examiner—Patrick Garvin
Attorney, Agent, or Firm—Carl G. Ries; Robert A. Kulason; Carl G. Seutter

[57] ABSTRACT

A novel catalyst, possessing phase transfer properties contains an alumina or silica substrate bearing at least one poly(oxyethylene) or poly(oxypropylene) residue bonded through an oxygen atom to the substrate.

23 Claims, No Drawings

PROCESS

FIELD OF THE INVENTION

This invention relates to a catalyst possessing phase transfer properties. More particularly it relates, in a specific embodiment, to a novel catalyst containing a poly(oxyethylene) or poly(oxypropylene) moiety bonded, through an oxygen atom to a metal oxide substrate.

BACKGROUND OF THE INVENTION

As is well known to those skilled in the art, reactions between ionic reagents and non-polar reagents may be less than satisfactory because of the mutual immiscibility which generally characterizes the components of the system. Polar solvents such as dimethylformamide (DMF) or dimethyl sulfoxide (DMSO) may be employed; but use of such solvents introduces undesired problems. Glycols such as polyethylene glycol or polypropylene glycol may be used as solvents for such reactions; and indeed they possess many properties which render them satisfactory: low cost, low vapor pressure, low toxicity, and ready availability. However the difficulty of separating reaction product from eg polyethylene glycol is prohibitive because it requires extensive work-up such as distillation and/or extraction. See E. Santaniello et al Tetrahedron Lett., 4581 (1979).

U.S. Pat. No. 4,173,693 to Dow as assignee of Au et al discloses products typified by the reaction product of a poly(ethylene glycol ether) and a chloromethylated polystyrene resin. Hertl et al (J. Phys. Chem 77, 1120, 1973) discloses reaction of alcohols with alumina. Baverez et al (Bull. Soc. Chim. Fr. 3662 1962) discloses reaction of alcohols with silica gel.

It is desirable to carry out reactions between ionic reagents and non-polar reagents using a phase transfer catalyst which is characterized by its ability to bring one of the reactants into the normal phase of the other in such a form that high reaction rates are obtained.

It is an object of this invention to provide a novel composition particularly characterized by its ability to serve as a phase transfer catalyst. Other objects will be apparent to those skilled in the art.

STATEMENT OF THE INVENTION

In accordance with certain of its aspects, this invention is directed to a process for preparing a functionalized porous refractory oxide which comprises (i) recting a porous refractory oxide, bearing surface hydroxyl groups, with a polyoxyalkylene glycol or monoalkyl ether reactant

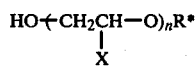

wherein R* is hydrogen or lower alkyl hydrocarbon group containing 1-8 carbon atoms, X is hydrogen or methyl, and n is 1-300 thereby forming a functionalized oxide bearing at least one

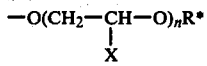

residue on the surface of said oxide; and (ii) recovering said functionalized oxide bearing at least one

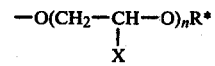

residue on the surface thereof.

DESCRIPTION OF THE INVENTION

The charge solid oxides which may be used as substrates in practice of the process of this invention may include a wide variety of porous refractory oxides typified by those which may commonly be used as inert catalyst supports. Although they may be used in impure form or as mixtures, more consistent results may be attained by the use of one species of pure porous refractory metal oxide. Illustrative of the porous refractory solid metal (including metalloid) oxides may be oxides of boron, magnesium, aluminum, silicon, phosphorus, calcium, titanium, vanadium, chromium, manganese, iron, cobalt, nickel, copper, zinc, arsenic, cadmium, barium, etc. It will be apparent that certain oxides typified by those of sodium may be too active under reaction conditions and may not be employed. Others may be too expensive. The preferred solid refractory oxides are those commonly referred to as inert and which have heretofore been proposed for use as catalyst supports. Most preferred are aluminum oxide ($Al_2O_3$) and silicon dioxide ($SiO_2$). Complex oxides may be employed viz: silica-magnesia; etc. It will be apparent that silicon is frequently referred to as a metalloid; but it is intended to be embraced within the term "metal" as used herein; and in fact silicon dioxide is a preferred charge solid porous refractory metal oxide. A preferred form of silica is that referred to as silica gel.

It is also possible to use as substrates refractory oxides which are crystalline aluminosilicates including synthetic zeolites typified by zeolites X, Y. ZSM-4, ZSM-5, ZSM-11, ZSM-21 etc. as well as naturally occurring zeolites such as erionite, faujasite, mordenite, etc.

The surface of the charge porous refractory metal oxide bears a plurality of pendant hydroxyl groups. Although it may be possible to use the porous refractory oxides as they are obtained, it is preferred to pretreat them preferably by heating to drive off adsorbed water, at 50° C.–450° C. say 200° C. for 1-24 hours, say 6 hours at atmospheric pressure. In the case of silica, it may alternatively be desirable to pretreat by reaction in aqueous medium in liquid phase with a Bronsted acid, typically at 25° C.–100° C., say 100° C. for 1-24 hours, say 4 hours. Illustrative Bronsted acids include hydrogen halides, preferably hydrogen chloride.

During this pretreatment, it appears that additional hydroxyl groups may be made available for reaction. Pretreatment is not necessary however.

In practice of the process of this invention, the charge porous refractory metal oxide, preferably silica or alumina, may be reacted with a polyoxyalkylene glycol or a mono ether thereof; these compositions being characterized by the presence of at least one free hydroxyl group. In these compositions, the hydrogen of this free hydroxyl group reacts with an —OH group on the charge oxide and the residue becomes bonded to the oxide.

Preferred are poly(oxyethylene) residues or poly(oxypropylene) residues derived respectively from polyethylene glycol or polypropylene glycol. This residue may be characterized by the formula:

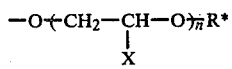

wherein X is hydrogen or methyl, preferably hydrogen. In the formula, n may be 1-300, preferably 8-42, say 20.

R* may be hydrogen or a lower $C_1$-$C_8$ alkyl hydrocarbon group, preferably methyl. It will be apparent to those skilled in the art that when R* is other than hydrogen, eg methyl, the residue may be derived from the mono ethers (eg the monomethyl ether) of polyethylene glycol or polypropylene glycol.

Illustrative glycols (including monoalkyl ethers) which may be employed may include those listed in the following table, the first listed being preferred (in each case, n is typically 10, 20, or 40).

TABLE $HO(CH_2CH_2O)_nH$
$HO(CH_2CH_2O)_nCH_3$
$HO(CH_2CH_2O)_nC_2H_5$ $HO(CH_2CHO)_nH$
|
$CH_3$ $HO(CH_2CHO)_nCH_3$
|
$CH_3$ $HO(CH_2CHO)_nC_2H_5$
|
$CH_3$

It is a feature of the process of this invention that the products of this invention, useful as phase transfer catalysts, may be formed by reaction of the (i) polyoxyalkylene glycols with (ii) a porous refractory oxide.

During the reaction, the following may typically occur:

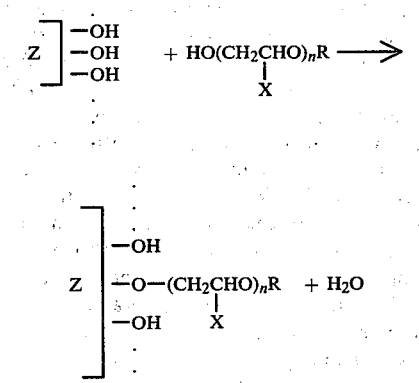

In the formulae, Z represents the porous oxide body, and it may include oxide group or hydroxide groups in addition to those which are shown. Clearly more than one polyoxyalkylene residue may be bonded to the porous oxide body and they may or may not be bonded to adjacent atoms.

Generally the product may be described as a porous refractory oxide bearing a plurality of groups

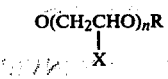

The glycol derived groups may be present typically in amount of 0.1-1, preferably 0.1-0.6, say about 0.3 millimoles of glycol per gram of support.

Clearly it is possible to bond residues from different polyoxyalkylene residues to the same oxide body.

Reaction may be carried out in liquid phase by adding the refractory oxide (typically alumina or silica gel) to the polyoxyalkylene glycol or monoalkyl ether reactant. Preferably the ratio may be 0.00001-0.01 moles, typically 0.0001-0.001 moles, say 0.0004 moles of polyalkylene glycol or monoalkyl ether per gram of refractory oxide. Reaction is preferably carried out in inert solvent which may be a hydrocarbon such as hexane, heptane, benzene, toluene, or xylene, or an ether such as ethyl ether. Preferably the solvent is toluene. The reaction mixture may be maintained at 25° C.-200° C., more preferably 50° C.-200° C., say 110° C. for 1-24 hours, say 3 hours. Preferred temperature is reflux temperature of solvent. It is advantageous to use a Dean Stark trap to remove the water produced, this being effected by azeotropic distillation.

After the reaction is complete, the product may be filtered and washed with fresh solvent. Air drying for 1-48 hours, say 24 hours at 25° C.-150° C., say 25° C. typically yields a white powder. It may be advantageous to soxhlet extract the product to remove adsorbed glycol with a solvent such as toluene or methanol.

The products so prepared may be used as phase transfer catalysts. They are found to be particularly characterized by good yield and selectivity under moderate temperature and pressure conditions. They are also advantageous in that they may be prepared at moderate cost and they are easily recovered from the product mixture—usually by simple filtration.

It is a feature of this invention according to one of its aspects that the phase transfer catalysts of this invention may find particular use in reactions of the type $$R^{}A + EY \rightarrow R^{}Y$$

wherein R is a hydrocarbon group, bonded to A through a non-tertiary carbon atom, which may be an alkyl group, an aralkyl group, or a cycloalkyl group, including such radicals when inertly substituted. When R is alkyl, it may typically be methyl, ethyl, n-propyl, iso-propyl, n-butyl, 1-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. R may be inertly substituted i.e. it may bear a non-reactive substituent such as alkyl, aryl, cycloalkyl, ether, nitro, etc. Typically inertly substituted R groups may include 2-ethoxyethyl, carboethoxymethyl, 4-methyl cyclohexyl, etc. The preferred R groups may be lower alkyl, i.e. $C_1$-$C_{10}$ alkyl, group including eg methyl, ethyl, n-propyl, i-propyl, butyl, amyl, hexyl, octyl, decyl, etc. R may preferably be n-butyl.

A in the above formula is a halide, preferably an active halide i.e. chloride, bromide, or iodide.

Typical R** A compositions may include 1-bromobutane, 1-iodobutane, 2-bromobutane, benzyl bromide, benzyl chloride, 3-chloro-1-pentene, cyclohexyl bromide, etc. Preferred may be alkyl halides such as 1-bromobutane.

The compound EY is a nucleophile typified by those wherein E is a cation (including reaction medium-soluble cations), preferably an alkali metal or alkaline earth metal. Preferred is sodium. Y may be any reaction medium-soluble anion (eg a carboxylate) of an organic acid typified by formate, acetate, succinate, etc. Preferred EY may be sodium acetate or potassium acetate.

The reaction, typically between 1-bromobutane and potassium acetate to yield butyl acetate may be carried out at 25° C.–150° C., preferably at 110° C. for 1–24 hours, say about 3 hours—depending upon the yield desired. Reaction is preferably carried out in solvent. It is found that use of hydrocarbons such as toluene as solvent is satisfactory.

The ability of the novel catalyst system of this invention to function as a phase transfer catalyst may be illustrated by the reaction wherein 1-bromobutane is converted to normal butyl acetate by reaction in toluene solvent, with a nucleophile typified by a salt of acetic acid such as potassium acetate. No reaction is observed between 1-bromobutane and potassium acetate in the absence of any catalyst—0% conversion to n-butyl acetate is observed. Similar results are achieved when the "catalyst" is unfunctionalized silica or unfunctionalized alumina at toluene reflux temperature. However, use of the preferred catalyst of this invention permits attainment of 33%–58% conversion after 3 hours.

In accordance with certain of its aspects, this invention is directed to a process for oxidizing a hypochlorite-oxidizable group which comprises maintaining a compound bearing a hypochlorite-oxidizable hydroxyl group or amino group or amide group or aldehyde group at oxidizing conditions in the presence of, as catalyst a porous refractory oxide composition bearing a plurality of groups

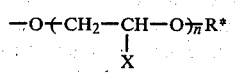

wherein
X is hydrogen or methyl;
n is 1–300; and
R* is hydrogen or a lower alkyl hydrocarbon group containing 1–8 carbon atoms.

Hypochlorite-oxidizable groups include:
(i) hydroxy groups bonded to a primary or secondary carbon atom—which may be oxidized to an aldehyde, ketone, or to an acid;
(ii) amine groups bonded to a primary carbon atom—which may be oxidized to a nitrile;
(iii) amide groups—which may be oxidized to a nitrile;
(iv) aldehyde groups—which may be oxidized to an acid; etc.

Compounds which may be oxidized include those wherein the oxidizable hydroxy or amine groups are bonded to a primary or secondary carbon in a hydrocarbon chain derived from an alkane, an alkene, an alkyne, a cycloalkane, a cycloalkene, or an arylalkane. When the group is an —OH group, the preferred compounds which may be oxidized include monoalcohols such as ethanol, propanol, butanols, 2-ethylhexanol, benzyl alcohol, etc. When the group is an —NH$_2$ group, the preferred compounds which may be oxidized include primary mono-amines such as ethyl amine, propyl amine, butyl amine, cyclohexyl amine, benzyl amine, etc. See U.S. Pat. No. 3,996,259 and Dehmlow et al *Phase Transfer Catalysts*, Verlag Chemie, Weinheim (1980).

The oxidized product in the case of the amine is the nitrile. Thus ethyl amine may be oxidized to acetonitrile; benzyl amine may be oxidized to benzonitrile, etc.

When the oxidizable group is a hydroxy group the oxidation product may be the aldehyde, ketone, or the acid. Thus ethanol may be oxidized to acetic acid; propanol may be oxidized to propanal or propanoic acid; etc.

In the case of an amide group, a typical reaction may be the oxidation of acetamide to acetonitrile.

In the case of an aldehyde group, a typical reaction may be the oxidation of acetaldehyde to acetic acid. In the case of a compound containing an activated double bond, a typical reaction may be the oxidation of propene to propylene glycol or propylene oxide.

It is however a particular feature of this invention that the novel catalyst system permits selective oxidation of benzyl alcohol to benzaldehyde with little or no co-production of the corresponding acid. Oxidation with hypohalite is typically carried out at 15° C.–150° C., say 20° C. Although temperatures at or below reflux temperature may be employed, it is preferred to use ambient temperature over 1–48 hours, say 24 hours. Reaction is preferably carried out in 4 w %–6 w % aqueous sodium hypochlorite solution in the presence of an organic co-solvent. Preferred organic co-solvents may include halogenated hydrocarbons such as methylene chloride (CH$_2$Cl$_2$), esters such as ethyl acetate, etc.

The selective oxidation of benzyl alcohol is typically carried out using an aqueous sodium hypochlorite solution (4–6%) and an organic co-solvent. Organic co-solvent may include esters of carboxylic acids typified by alkyl acetates such as ethyl acetate; or halogenated hydrocarbons such as methylene chloride CH$_2$Cl$_2$. The mixture is stirred at room temperature for 24 hours. In the absence of any catalyst only a 5% conversion to benzaldehyde is observed using methylene chloride as the co-solvent. When the "catalyst" is unfunctionalized alumina a 16% conversion is noted after 24 hours. When the preferred catalyst is used, in particular the alkyl ether derivatives immobilized on alumina, a 30% conversion is observed with methylene chloride as the organic co-solvent. The alkyl ethers are the preferred catalysts as the glycols themselves may contain oxidizable alcohol functionality.

It is a particular feature of the catalysts produced by the process of this invention that they may possess specificity. For example catalyst using an alumina substrate may be found to be more desirable when used in aqueous medium. Catalysts using a silica substrate may be found to be preferred when the reaction is carried out in non-aqueous media. For mixed media, such as toluene-water, the preferred substrate may be alumina.

DESCRIPTION OF PREFERRED EMBODIMENTS

Practice of the novel process of this invention may be apparent from the following description of preferred embodiments.

All reactions were carried out using reagent grade materials with no prior purification. Silica gel (W. R.

Grace, Grade 62, 60–200 mesh) and alumina (Aldrich, neutral, chromatographic grade) were used directly from the bottle.

All experiments were routinely done under an inert atmosphere.

CATALYST PREPARATION

EXAMPLE I

Reaction of Polyethylene Glycol (average m.w. 400) and Silica Gel.

In this example which represents practice of a preferred embodiment, there was added to a one liter 3-neck flask, fitted with a mechanical stirrer and a Dean Stark trap with reflux condenser, 200 g silica gel, 35 g (90 mmoles) polyethylene glycol (mw 400) and 600 ml toluene. The mixture was heated at reflux for 3.5 hours and 8.6 ml (0.48 moles) water was removed as distillate.

After cooling, the product was filtered, and then soxhlet extracted with fresh toluene for 12 hours. The powder was dried by stripping on a rotary evaporator at 75° C. under water aspirator vacuum to yield 207 g of a white solid containing 6.9 w % C.

EXAMPLE II

Reaction of Polyethylene Glycol (average mw 400), and alumina.

Into a flask described in Example I was added 200 g alumina, 35 g (90 mmoles) polyethylene glycol (mw 400) and 600 ml toluene. The reaction procedure and work-up followed the same procedure as Example I with 0.5 ml distillate water removed. Drying of the solid at 75° C. produced 215 g of a white powder containing 4.1% C.

EXAMPLE III

Reaction of Polyethylene Glycol Monomethylether (average m.w. 350), and Silica Gel.

Into a flask equipped as in Example I was added 200 g silica gel, 35 g (100 mmoles) polyethylene glycol monomethylether (m.w. 350) and 600 ml toluene. The same reaction conditions and work-up as Example I were followed with 7.5 ml water being removed. Drying the extracted solid at 75° C. afforded a white powder (199 g) containing 5.6% C.

EXAMPLE IV

Reaction of Polyethylene Glycol Monomethylether (average m.w. 350), and Alumina.

The same procedure as in Example I was followed except 200 g of alumina was used in place of silica gel and the polyoxyalkylene polyol was polyethylene glycolmonomethylether (M.W. 350)—35 g (0.1 mole). Less than 0.5 ml water was recovered as distillate. Drying yielded a white powder (216 g) containing 3.1% C.

EXAMPLE V

Reaction of Polyethylene Glycol monomethyl ether (average m.w. 350) and Silica Gel.

Into a flask described in Example I was added 200 g silica gel and 650 ml toluene. The mixture was heated to reflux until no more water was observed in the azeotrope (3 hours). The water was removed from the trap 3.8 ml, 0.21 mole). The reaction mixture was subsequently cooled and 35 g (0.1 mole) polyethylene glycol monomethylether (MW 350) was added to the pot. The flask was heated at reflux an additional 3 hours and 1.8 ml (0.1 mole) water was taken off. The crude product was filtered and the white solid soxhlet extracted with toluene for 12 hours. Drying at 75° C. afforded 214 g of a white powder containing 7.5% C.

TABLE
CATALYST PREPARATION

| Example | % C | mmoles glycol/gram support (approx.) |
|---------|-----|--------------------------------------|
| I       | 6.9 | 0.33                                 |
| II      | 4.1 | 0.20                                 |
| III     | 5.6 | 0.30                                 |
| IV      | 3.1 | 0.17                                 |
| V       | 7.5 | 0.36                                 |

CATALYST EVALUATION

EXAMPLE VI

Reaction of product from Example I with 1-bromobutane and potassium acetate in toluene solvent.

Into a 250 ml 3-neck flask fitted with a mechanical stirrer and reflux condenser was added 15 g (0.15 mole) potassium acetate, 70 ml toluene, and 7 g n-decane (as an internal standard). To this mixture was added 20 g (0.007 mole) Example I, and 7 g (0.05 mole) 1-bromobutane. The solution was heated to reflux for 3 hours and, after cooling, filtered through a sintered glass funnel. The filter cake was washed slowly with 50 ml methylene chloride.

The filtrate was transferred to a simple distillation apparatus and the solvent distilled off to a head temperature of 70° C. Analysis of the residue by gas chromatography showed a 58% conversion to n-butyl acetate (56% yield).

EXAMPLE VII

Reaction of product from Example II with 1-bromobutane and potassium acetate in toluene solvent.

Into a 250 ml 3-neck flask equipped as in Example VI was added 15 g (0.15 mole) potassium acetate, 70 ml toluene, and 7 g n-decane. To this mixture was added 20 g (0.004 mole) of the product of Example II, and 7 g (0.05 mole) 1-bromobutane. The solution was heated to reflux for 3 hours and the procedure and workup followed as in Example VI. Analysis of the residue by gas chromatography showed a 33% conversion to n-butyl acetate (32% yield).

TABLE
CATALYST EVALUATION
Preparation of Butyl Acetate from 1-Bromobutane and Potassium Acetate.

| Example | Catalyst (mmole) | Reaction Conditions Time (hrs)/Temp. (°C.) | % Conversion |
|---------|------------------|--------------------------------------------|--------------|
| VI      | I (7)            | 3/110                                      | 58%          |
| VII     | II (4)           | 3/110                                      | 33%          |

EXAMPLE VIII

Oxidation of benzyl alcohol with aqueous sodium hypochlorite using the product of Example III.

Into a 250 ml 3-neck flask fitted with a mechanical stirrer and reflux condenser was added 4 g (0.037 mole) benzyl alcohol, 75 ml methylene chloride and 20 g (0.006 mole) product of Example III. The mixture was stirred 15 minutes and 75 ml (0.05 mole) of a 4–6% aqueous sodium hypochlorite solution was added slowly while maintaining the pot temperature at 20° C. with an ice bath. The mixture was stirred 24 hours at room temperature.

The crude mixture was filtered and the filter cake washed with 50 ml methylene chloride. The filtrate was transferred to a separatory funnel and the organic layer withdrawn and saved. The aqueous layer was washed twice with 25 ml methylene chloride, the organic layers combined and the solvent distilled off. Gas chromatographic analysis of the crude product indicated a 29% conversion to benzaldehyde.

EXAMPLE IX

Oxidation of benzyl alcohol with aqueous sodium hypochlorite using the product of Example IV.

Into a 250 ml 3-neck flask fitted as in Example VIII was added 4 g (0.037 mole) benzyl alcohol, 75 ml methylene chloride, and 20 g (0.003 mole) product of Example IV. Aqueous sodium hypochlorite (75 ml, 4–6% solution, 0.05 mole) was added and the procedure and workup followed that of Example VIII. Gas chromatographic analysis of the crude product indicated a 30% conversion to benzaldehyde.

EXAMPLE X

In a control example, the procedure of Example VIII was duplicated except that no catalyst was present. Conversion to benzaldehyde was 5%.

EXAMPLE XI

In a control example, the procedure of Example VIII was duplicated except that the "catalyst" was unfuntionalized alumina. Conversion to benzaldehyde was 16%.

EXAMPLE XII

In Example XII, polyethylene glycol (M.W. 400) was stirred at room temperature with silica gel for four hours. The product was filtered, washed with toluene, and dried.

The sample was then soxhlet extracted for 12 hours with toluene, dried, and analyzed for % carbon.

The sample was then further extracted for 12 hours with methanol, dried, and analyzed for % carbon.

The results are as tabulated below.

EXAMPLE XIII

In this example, the procedure of Example XII was followed except that the initial reaction was carried out at 100° C. for 3 hours.

TABLE

|  | Example % Carbon | |
|---|---|---|
|  | XII | XIII |
| After Toluene Extraction | 6.96 | 7.68 |
| After Methanol Extraction | 2.14 | 5.26 |

From the above table, it will be apparent to those skilled in the art that when the reaction mixture is maintained at room temperature (Ex XII) which is outside the preferred range of 50° C.–200° C., there is formed only a small amount of the desired product—the glycol is extracted out by the methanol.

In contrast in Example XIII, wherein reaction is carried out at reflux temperature of about 110° C., little glycol was extracted out by the methanol, as measured by the carbon content of the product.

It should be noted that, when the catalyst is to be subsequently used in a particular solvent, it is preferred to extract remaining glycol (prior to use) by extraction with that solvent.

Although this invention has been illustrated by reference to specific embodiments, it will be apparent to those skilled in the art that various changes and modifications may be made which clearly fall within the scope of this invention.

I claim:

1. The process for preparing a functionalized refractory oxide which comprises
   (i) reacting a porous refractory oxide bearing surface hydroxyl groups with a polyoxyalkylene glycol or monoalkyl ether

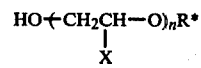

wherein R* is hydrogen or lower alkyl hydrocarbon group containing 1–8 carbon atoms, X is hydrogen or methyl, and n is 1–300 thereby forming a functionalized oxide bearing at least one

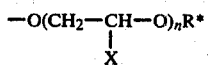

residue on the surface of said oxide; and
   (ii) recovering said functionalized oxide bearing at least one

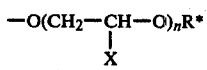

residue on the surface thereof.

2. The process for preparing functionalized refractory oxide as claimed in claim 1 wherein said oxide is silica.

3. The process for preparing functionalized refractory oxide as claimed in claim 1 wherein said oxide is alumina.

4. The process for preparing functionalized refractory oxide as claimed in claim 1 wherein said reactions carried out in liquid phase in inert solvent.

5. The process for preparing functionalized refractory oxide as claimed in claim 1 wherein said reaction is carried out in liquid phase in inert hydrocarbon solvent.

6. The process for preparing functionalized refractory oxide as claimed in claim 1 wherein said reaction is carried out in liquid phase in toluene solvent.

7. The process for preparing functionalized refractory oxide as claimed in claim 1 wherein said reaction is carried out at 50° C.–200° C.

8. The process for preparing functionalized refractory oxide as claimed in claim 1 wherein said reaction is carried out in refluxing solvent at reflux temperature.

9. The process for preparing functionalized refractory oxide as claimed in claim 1 wherein said polyoxyalkylene glycol is polyoxyethylene glycol.

10. The process for preparing functionalized refractory oxide as claimed in claim 1 wherein said polyoxyalkylene glycol is polyoxypropylene glycol.

11. The process for preparing functionalized refractory oxide as claimed in claim 1 wherein said polyoxyalkylene glycol is polyoxyethylene glycol monoether.

12. The process for preparing functionalized refractory oxide as claimed in claim 1 wherein said polyoxyalkylene glycol is polyoxyethylene glycol monomethyl ether.

13. The process for preparing a functionalized silica which comprises:
(i) reacting silica gel with polyoxyethylene glycol in inert hydrocarbon solvent at solvent reflux temperature for 1–24 hours thereby splitting out water and forming functionalized silica bearing at least one $$-O+CH_2CH_2-O+_nH$$

residue on the surface of said silica, wherein n is 1–300; and
(ii) recovering said functionalized silica bearing at least one $$-O+CH_2CH_2-O+_nH$$

residue on the surface thereof.

14. The process for preparing a functionalized alumina which comprises:
(i) reacting alumina with polyoxyethylene glycol in inert hydrocarbon solvent at solvent reflux temperature for 1–24 hours thereby splitting out water and forming functionalized alumina bearing at least one $$-O+CH_2CH_2-O+_nH$$

residue on the surface of said alumina, wherein n is 1–300; and
(ii) recovering said functionalized alumina bearing at least one $$-O+CH_2CH_2-O+_nH$$

residue on the surface thereof.

15. A functionalized porous refractory oxide composition comprising
(i) a porous refractory oxide bearing on the surface thereof,
(ii) at least one polyoxyalkylene residue $$-O+CH_2CH-O+_nR^*$$
$$\qquad\quad |$$
$$\qquad\quad X$$

wherein R* is hydrogen or lower alkyl hydrocarbon group containing 1–8 carbon atoms, X is hydrogen or methyl, and n is 1–300.

16. A functionalized refractory oxide composition as claimed in claim 15 wherein the porous refractory oxide is silica gel.

17. A functionalized refractory oxide composition as claimed in claim 15 wherein the porous refractory oxide is alumina.

18. A functionalized refractory oxide composition as claimed in claim 15 wherein said polyoxyalkylene residue is a residue of polyoxyethylene glycol.

19. A functionalized refractory oxide composition as claimed in claim 15 wherein said polyoxyalkylene residue is a residue of polyoxypropylene glycol.

20. A functionalized refractory oxide composition as claimed in claim 15 wherein said polyoxyalkylene residue is a residue of polyoxyethylene glycol monoether.

21. A functionalized refractory oxide composition as claimed in claim 15 wherein said polyoxyalkylene residue is a residue of polyoxyethylene glycol monomethyl ether.

22. A functionalized porous refractory silica gel composition comprising a silica gel bearing on the surface thereof at least one polyoxyalkylene residue.

23. A functionalized porous refractory alumina composition comprising an alumina bearing on the surface thereof at least one polyoxyalkylene residue.

* * * * *